United States Patent
Ben-Haim et al.

(10) Patent No.: US 10,034,188 B2
(45) Date of Patent: Jul. 24, 2018

(54) FINE-TIMING MEASUREMENT EXCHANGE

(71) Applicant: INTEL CORPORATION, Santa Clara, CA (US)

(72) Inventors: Shani Ben-Haim, Haifa (IL); Gaby Prechner, Rishon Lezion (IL)

(73) Assignee: INTEL CORPORATION, Santa Clara, CA (US)

( * ) Notice: Subject to any disclaimer, the term of this patent is extended or adjusted under 35 U.S.C. 154(b) by 102 days.

(21) Appl. No.: 14/419,921

(22) PCT Filed: Dec. 27, 2013

(86) PCT No.: PCT/US2013/078116
§ 371 (c)(1),
(2) Date: Feb. 5, 2015

(87) PCT Pub. No.: WO2015/041708
PCT Pub. Date: Mar. 26, 2015

(65) Prior Publication Data
US 2016/0044524 A1 Feb. 11, 2016

Related U.S. Application Data

(60) Provisional application No. 61/879,301, filed on Sep. 18, 2013.

(51) Int. Cl.
*H04W 24/10* (2009.01)
*G01S 5/14* (2006.01)
(Continued)

(52) U.S. Cl.
CPC ........... *H04W 24/10* (2013.01); *G01S 5/0221* (2013.01); *G01S 5/14* (2013.01); *G01S 13/767* (2013.01); *H04L 43/106* (2013.01)

(58) Field of Classification Search
CPC .... H04W 24/10; H04L 43/106; G01S 5/0221; G01S 5/14; G01S 5/009; G01S 5/02;
(Continued)

(56) References Cited

U.S. PATENT DOCUMENTS

2008/0248741 A1 10/2008 Alizadeh-Shabdiz
2009/0258658 A1 10/2009 Edge et al.
(Continued)

FOREIGN PATENT DOCUMENTS

JP 2008228035 9/2008
JP 2009105662 5/2009
(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
(Continued)

*Primary Examiner* — Pao Sinkantarakorn
*Assistant Examiner* — Kabir Jahangir
(74) *Attorney, Agent, or Firm* — Shichrur & Co.

(57) ABSTRACT

Embodiments of a system and method for establishing a physical location of a device are generally described herein. In some embodiments a device may include a wireless device configured to communicate with an access point through the use of a wireless protocol, and to perform a method for time-of-flight (ToF) positioning that includes a three-stage fine-timing measurement (FTM) procedure that includes: a first stage for negotiating comeback timing for a next FTM exchange, a second stage that includes performing a fine timing measurement exchange and optionally negotiating the comeback timing for the next fine timing
(Continued)

measurement exchange, and a third stage that includes reporting and polling the timestamp of the previous fine timing measurement exchange and optionally performing an additional fine timing measurement stage. In some embodiments a module in a device may determine a range between the device and the access point or the one or more network devices.

35 Claims, 8 Drawing Sheets

(51) Int. Cl.
    *G01S 5/02*           (2010.01)
    *H04L 12/26*         (2006.01)
    *G01S 13/76*         (2006.01)

(58) Field of Classification Search
    CPC ...... G01S 5/021; G01S 5/0252; G01S 5/0018; G01S 5/0045; G01S 5/0063
    See application file for complete search history.

(56) References Cited

U.S. PATENT DOCUMENTS

| | | | |
|---|---|---|---|
| 2010/0246419 A1 | 9/2010 | Batta et al. | |
| 2012/0229334 A1* | 9/2012 | Waters | G01S 19/05 342/357.42 |
| 2012/0269170 A1 | 10/2012 | Chen et al. | |
| 2014/0073352 A1* | 3/2014 | Aldana | G01S 5/10 455/456.1 |
| 2014/0136093 A1* | 5/2014 | Banin | G01S 5/021 701/300 |
| 2014/0154996 A1* | 6/2014 | Banin | H04W 56/00 455/67.11 |
| 2014/0160959 A1* | 6/2014 | Aldana | H04L 43/0864 370/252 |
| 2014/0171109 A1* | 6/2014 | Segev | G01S 5/0027 455/456.1 |
| 2014/0187259 A1* | 7/2014 | Kakani | H04W 64/00 455/456.1 |
| 2014/0200026 A1* | 7/2014 | Aldana | G01S 5/0205 455/456.1 |
| 2014/0253385 A1* | 9/2014 | Amizur | G01S 5/14 342/387 |
| 2014/0254511 A1* | 9/2014 | Aldana | H04W 56/003 370/329 |
| 2014/0335885 A1* | 11/2014 | Steiner | H04W 64/00 455/456.1 |
| 2014/0355461 A1* | 12/2014 | Aldana | G01S 5/00 370/252 |
| 2015/0049716 A1* | 2/2015 | Gutierrez | H04W 84/12 370/329 |
| 2015/0063138 A1* | 3/2015 | Aldana | H04W 24/02 370/252 |
| 2015/0168536 A1* | 6/2015 | Banin | G01S 5/0205 455/456.2 |

FOREIGN PATENT DOCUMENTS

| | | |
|---|---|---|
| JP | 2009529299 | 8/2009 |
| JP | 201050964 | 3/2010 |
| JP | 2012514427 | 6/2012 |
| JP | 2013517742 | 5/2013 |
| JP | 2016506650 | 3/2016 |
| JP | 2016517196 | 6/2016 |
| WO | 2012122573 | 9/2012 |
| WO | 2014092926 | 6/2014 |

OTHER PUBLICATIONS

IEEE Std 80216m™-2011. IEEE Standard for Local and metropolitan area networks—Part 16: Air Interface for Broadband Wireless Access Systems, Amendment 3: Advanced Air Interface, May 6, 2011, 1106 pages.
IEEE Std 802.11v™-2011. IEEE Standard for Information Technology—Telecommunications and information exchange between systems Local and metropolitan area networks—Specific requirements, Part 11: Wireless LAN Medium Access Control (MAC) and Physical Layer (PHY) specifications, Amendment 8: IEEE 802.11 Wireless Network Management, Feb. 9, 2011, 433 pages.
International Search Report and Written Opinion for International Application No. PCT/US2013/078116, dated Jun. 11, 2014, 12 pages.
International Preliminary Report on Patentability for PCT/US2013/078116, dated Mar. 31, 2016, 9 pages.
Office Action for Japanese Patent Application No. 2016-540872, dated Feb. 7, 2017, 10 pages. (Including 5 pages of English translation).
Carlos Aldana, et al., "IEEE P802.11 Wireless LANs, CIDs 46, 47, 48, Regarding Fine Timing Measurement", Nov. 13, 2012, 18 pages.
Office Action for Chinese Patent Application No. 201380078861.5, dated Feb. 22, 2017, 3 pages.
European Search Report for European Patent Application No. 13893725.5, dated Apr. 21, 2017, 7 pages.
Carlos Aldana (Qualcomm): "802.11-2012 CID 46 47 48; 11-12-1249-02-000m-802-11-2012-cid-46-47-48" IEEE SA MENTOR; 11-12-1249-02-000M-802-11-2012-CID-46-47-48, IEEE-SA MENTOR. Piscataway, NJ USA, vol. 802.11m, No. 2, Nov. 15, 2012, pp. 1-17, 17 pages.
Office Action for Chinese Patent Application No. 201380078861.5, dated Sep. 20, 2017, 8 pages.
Office Action for Japanese Patent Application No. 2016-540872, dated Oct. 24, 2017, 10 pages. (Including 5 pages of English translation).

\* cited by examiner

FINE-TIMING MEASUREMENT EXCHANGE

CROSS-REFERENCE

This patent application is a National Phase Application of PCT International Application No. PCT/US2013/078116, International Filing Date Dec. 27, 2013, which claims the benefit and priority of U.S. Provisional Patent Application Ser. No. 61/879,301, filed Sep. 18, 2013, all of which are incorporated by reference herein in their entirety.

TECHNICAL FIELD

Embodiments pertain to wireless communications. Some embodiments relate to time-of-flight positioning and device location wireless networks. Some embodiments relate to wireless networks that operate in accordance with one of the IEEE 802.11 standards. Some embodiments relate to the use of wireless geo-location, more specifically, some embodiments relate to determining a location of a device within a space equipped with a wireless network.

BACKGROUND

Accurately locating wireless network devices may incur a computational cost associated with performing numerous location determinations from multiple terrestrial sources. This computational cost may impact other processing activities of a device and also incur additional power consumption, which may degrade the performance or usability of the device. Thus there are general needs for systems and methods that reduce the costs associated with accurately locating a wireless device.

BRIEF DESCRIPTION OF THE DRAWINGS

Some embodiments are illustrated by way of example and not limitation in the figures of the accompanying drawings in which.

DETAILED DESCRIPTION

Figure 1:
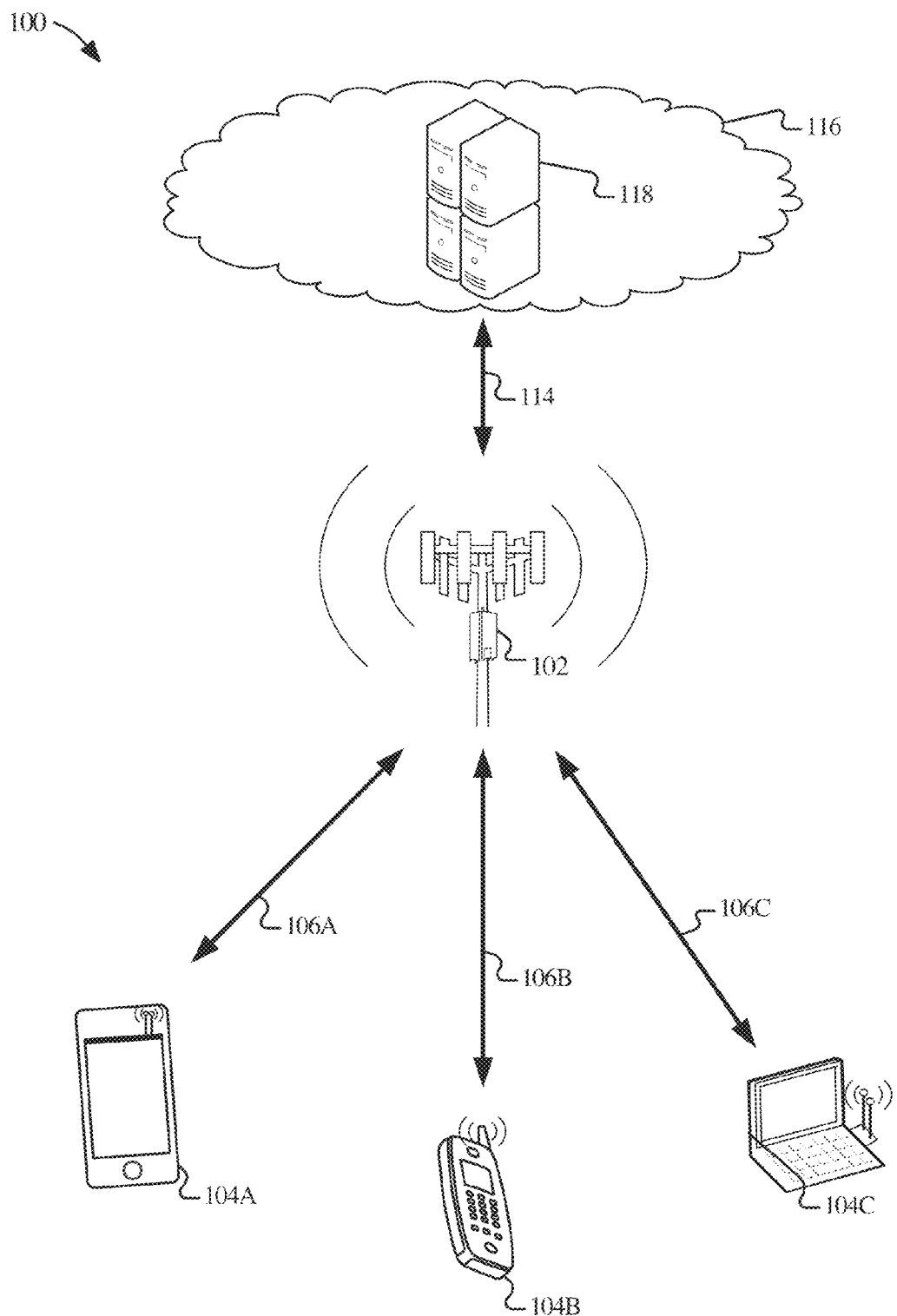
FIG. 1 is a block diagram of an example communication system in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various techniques and configurations described herein provide for a location discovery technique used in conjunction with wireless communications and network communications. The presently described location techniques may be used in conjunction with wireless communication between devices and access points. For example, a wireless local area network (e.g., Wi-Fi) may be based on, or compatible with, one of the Institute of Electrical and Electronics Engineers (IEEE) 802.11 standards.

With some network technologies, establishing the location of a device makes use of time of flight (TOF) calculations to calculate the distances between the device and multiple access points. For example, a device may request TOF information from two or more access points in order to establish a physical distance from each individual access point, and thereby determining an approximate physical location of the device with respect to the access points. In an example where the physical location of the access points is known, the access points may provide the device with that location information such that the device, alone or in conjunction with the access points, may determine a precise physical location of the device, for example, as a set of latitude and longitude values in a navigational coordinate system.

In connection with the presently described techniques, a wireless communications device is utilized to establish a connection with a wireless communications access point. In an example, an IEEE 802.11 standard, such as IEEE 802.11v, may define a frame exchange from which time of flight (ToF) can be determined, but assume the availability of a mobile device to receive the response at all times. However, ToF calculations may take few milliseconds, forcing the mobile device to dwell on the requested channel until a response arrives, thereby preventing the device from returning to the serving channel (if the serving channel is not equal to the current ToF exchange channel). This prevents the device from performing any power saving techniques, or performing an additional exchange with an AP on different channel. Additionally, ToF calculation resources may not be available at all times due to a prior interaction between the device and a recipient AP to prepare one side (or both) for the upcoming ToF measurement exchange.

In order to facilitate trilateration required for location accuracy, a device may perform a ToF exchange with several APs. For example, in an enterprise environment were access points frequency spread across the spectrum, additional time for the mobile device to dwell and/or out of channel may be needed and may be multiplied by the number of relevant ToF supporting APs set to different channels.

In some embodiments, a method for time-of-flight (ToF) positioning may include a three-stage fine-timing measurement (FTM) procedure performed by an initiating station and a responding station. The method may comprise a first stage (stage I) for negotiating comeback timing for a next FTM exchange; a second stage (stage II) that includes performing a fine-timing measurement exchange, and optionally negotiating the comeback timing for a next fine-timing measurement exchange; and a third stage (stage III) that includes reporting and polling the timestamp of the previous fine timing measurement exchange, and optionally performing an additional fine-timing measurement stage.

These location techniques may provide a ToF responder, for example an access point, with the capability to manage and prepare required ToF resources. They may also provide a ToF Initiator (e.g., a STA or device) a capability to perform parallel operations while waiting for responder resources, such operations may include: power save, performance of additional ToF requests with another responder, handling of serving channel traffic, or other functions. Additionally, the ToF infrastructure protocols described herein provide for additional extensions to location protocols, such as full availability of ToF resources at all times, fast channel estimation calculation, along with robust and well defined error handling mechanisms.

These location techniques may facilitate the determination of a device location using any of a variety of network protocols and standards in licensed or unlicensed spectrum bands, including Wi-Fi communications performed in connection with an IEEE 802.11 standard (for example, Wi-Fi communications facilitated by fixed access points), 3GPP LTE/LTE-A communications (for example, LTE Direct (LTE-D) communications established in a portion of an uplink segment or other designated resources), machine-to-machine (M2M) communications performed in connection with an IEEE 802.16 standard, and the like.

FIG. 1 provides an illustration of an example configuration of a communication network architecture 100. Within the communication network architecture 100, a carrier-based network such as an IEEE 802.11 compatible wireless access point or a LTE/LTE-A cell network operating according to a standard from a 3GPP standards family is established by network equipment 102. The network equipment 102 may include a wireless access point, a Wi-Fi hotspot, or an enhanced or evolved node B (eNodeB) communicating with communication devices 104A, 104B, 104C (e.g., a user equipment (UE) or a communication station (STA)). The carrier-based network includes wireless network connections 106A, 106B, and 106C with the communication devices 104A, 104B, and 104C, respectively. The communication devices 104A, 104B, 104C are illustrated as conforming to a variety of form factors, including a smartphone, a mobile phone handset, and a personal computer having an integrated or external wireless network communication device.

The network equipment 102 is illustrated in FIG. 1 as being connected via a network connection 114 to network servers 118 in a cloud network 116. The servers 118 may operate to provide various types of information to, or receive information from, communication devices 104A, 104B, 104C, including device location, user profiles, user information, web sites, e-mail, and the like. The techniques described herein enable the determination of the location of the various communication devices 104A, 104B, 104C, with respect to the network equipment 102 without requiring the various communication devices to establish a communication session with more than one network equipment.

Communication devices 104A, 104B, 104C may communicate with the network equipment 102 when in range or otherwise in proximity for wireless communications. As illustrated, the connection 106A may be established between the mobile device 104A (e.g., a smartphone) and the network equipment 102; the connection 106B may be established between the mobile device 104B (e.g., a mobile phone) and the network equipment 102; and the connection 106C may be established between the mobile device 104C (e.g., a personal computer) and the network equipment 102.

The wireless communications 106A, 106B, 106C between devices 104A, 104B, 104C may utilize a Wi-Fi or IEEE 802.11 standard protocol, or a protocol such as the current 3rd Generation Partnership Project (3GPP) long term evolution (LTE) time division duplex (TDD)-Advanced systems. In one embodiment, the communications network 116 and network equipment 102 comprises an evolved universal terrestrial radio access network (EUTRAN) using the 3rd Generation Partnership Project (3GPP) long term evolution (LTE) standard and operating in time division duplexing (TDD) mode. The devices 104A, 104I, 104C may include one or more antennas, receivers, transmitters, or transceivers that are configured to utilize a Wi-Fi or IEEE 802.11 standard protocol or a protocol such as 3GPP, LTE, or TDD-Advanced or any combination of these or other communications standards.

Antennas in or on devices 104A, 104B, 104C may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to utilize spatial diversity and the different channel characteristics that may result between each of the antennas and the antennas of a transmitting station. In some MIMO embodiments, antennas may be separated by up to $1/10$ of a wavelength or more.

In some embodiments, the mobile device 104A may include one or more of a keyboard, a display, a non-volatile memory port, multiple antennas, a graphics processor, an application processor, speakers, and other mobile device elements. The display may be an LCD screen including a touch screen. The mobile device 104B may be similar to mobile device 104A, but does not need to be identical. The mobile device 104C may include some or all of the features, components, or functionality described with respect to mobile device 104A.

A base station, such as an enhanced or evolved node B (eNodeB), may provide wireless communication services to communication devices, such as device 104A. While the exemplary communication system 100 of FIG. 1 depicts only three devices users 104A, 104B, 104C any combination of multiple users, devices, servers and the like may be coupled to network equipment 102 in various embodiments. For example, three or more users located in a venue, such as a building, campus, mall area, or other area, and may utilize any number of mobile wireless-enabled computing devices to independently communicate with network equipment 102. Similarly, communication system 100 may include more than one network equipment 102. For example, a plurality of access points or base stations may form an overlapping coverage area where devices may communicate with at least two instances of network equipment 102.

Although communication system 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of system 100 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 100 may include one or more processors and may be configured with instructions stored on a computer-readable storage device.

Figure 2:
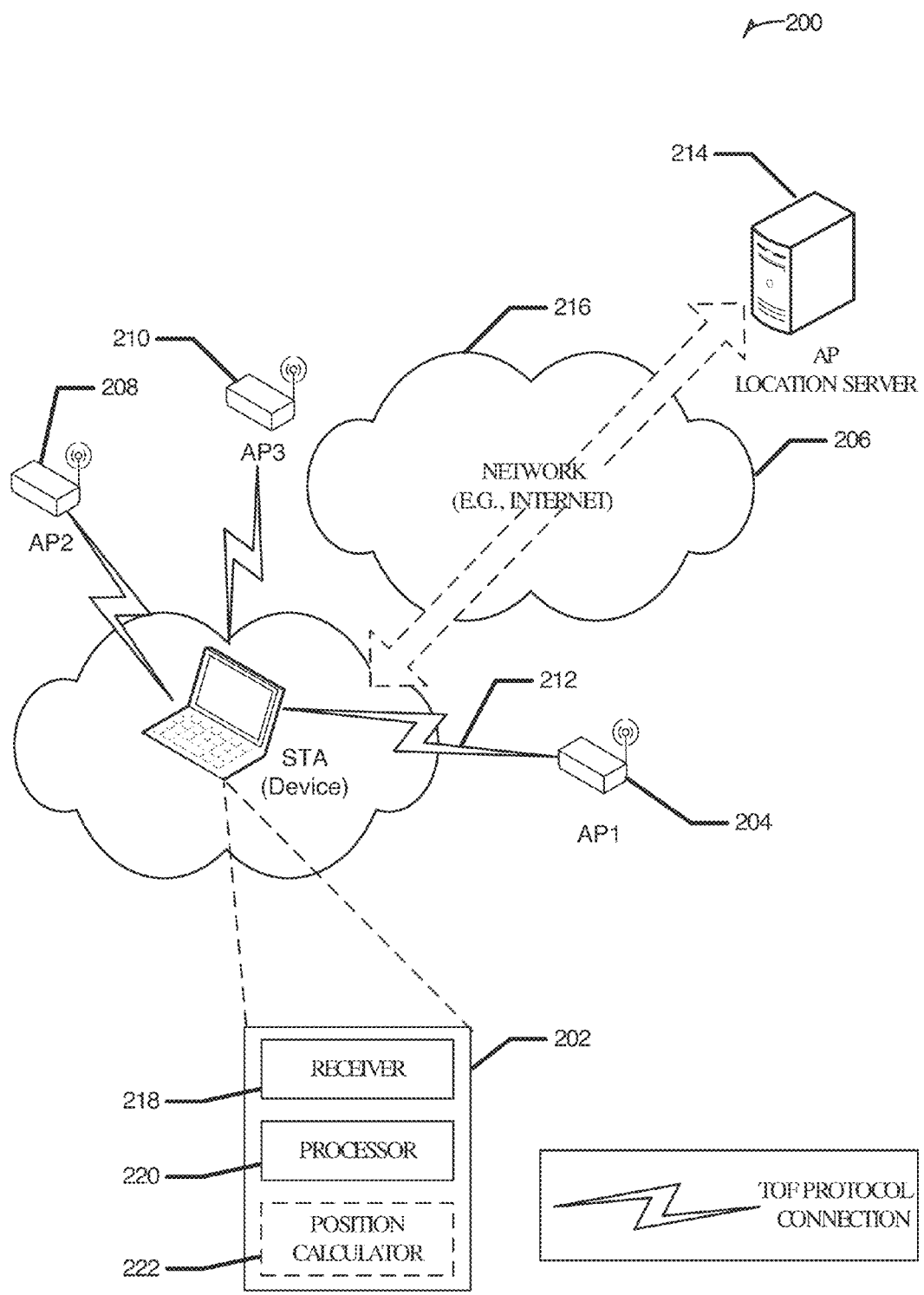
FIG. 2 is a block diagram of an example wireless communication system in accordance with some embodiments.

FIG. 2 is a block diagram of an example wireless communication system 200 that may utilize the communication network architecture 100 of FIG. 1. The exemplary communication system 200 may include a device 202 that is capable of wireless communication (e.g., a user equipment (UE) or communication station (STA)). The communication system 200 may include a device 202 that is capable of wireless communication. The device 202 may include a receiver 218 (e.g., as part of a transceiver) and a processor 220. The processor 220 may be any hardware, or subset of hardware, that can perform the specified operation. An enumeration of such hardware elements is given below with respect to FIG. 6, 7 or 8.

The processor 220 may be arranged to communicate with a position calculator 222. In an example, the position calculator 222 is local to (e.g., a part of, integrated with, belonging to, etc.) the device 202. In an example, the position calculator 222 is remote from (e.g., distant, accessible indirectly via a network (e.g., 206), in a different machine (e.g., server 214), etc.) from the device 202. When local, the processor 220 may perform the communication to the position calculator 222 via an interlink (e.g., bus, data port, etc.) of the device 202. When remote, the processor 220 may perform the communication to the position calculator via a network interface, such as via network interface card (NIC), or a wireless transceiver.

In an example, the device 202 may be a mobile computing device such as a cellular phone, a smartphone, a laptop, a tablet computer, a personal digital assistant or other electronic device capable of wireless communication. A first access point (AP) 204 may, for example, be a base station or a fixed wireless router. The device 202 may establish a communication link 212 with the first access point 204 in order to reach a network 206, such as the Internet. In an example, the device 202 may communicate with a access point locations server 214 via a link 216 over any available connection. For example, the device 202 may communicate with the access point locations server 214 via the link 216 through the first access point 204 and the network 206. The link 216 may, for example, utilize HyperText Transfer Protocol Secured (HTTPS) and transport layer security (TLS) to prevent the interception or unauthorized manipulation of data exchanged between the device 202 and the access point locations server 214. In an example, a cellular base station, such as network equipment 102 of FIG. 1, may provide the link 216 between the device 202 and the access point locations server 214.

In an example, a second access point 208 or a third access point 210 may be within range of the device 202. The device 202 may communicate with the first access point 204, the second access point 208 or the third access point 210. The device 202 may request location information regarding one or more of the first access point 204, the second access point 208, the third access point 210, or any other access point, from the access point locations server 214. In response to the location information request, the access point locations server 214 may provide the device 202, via link 216, with the location information corresponding to the requested access point. In an example, the device 202 may initiate a location request (e.g., a stage I negotiation of comeback timing) with the first access point 204. The first access point 204 may respond to the location request and allocate resources to perform a ToF measurement exchange.

Figure 3:
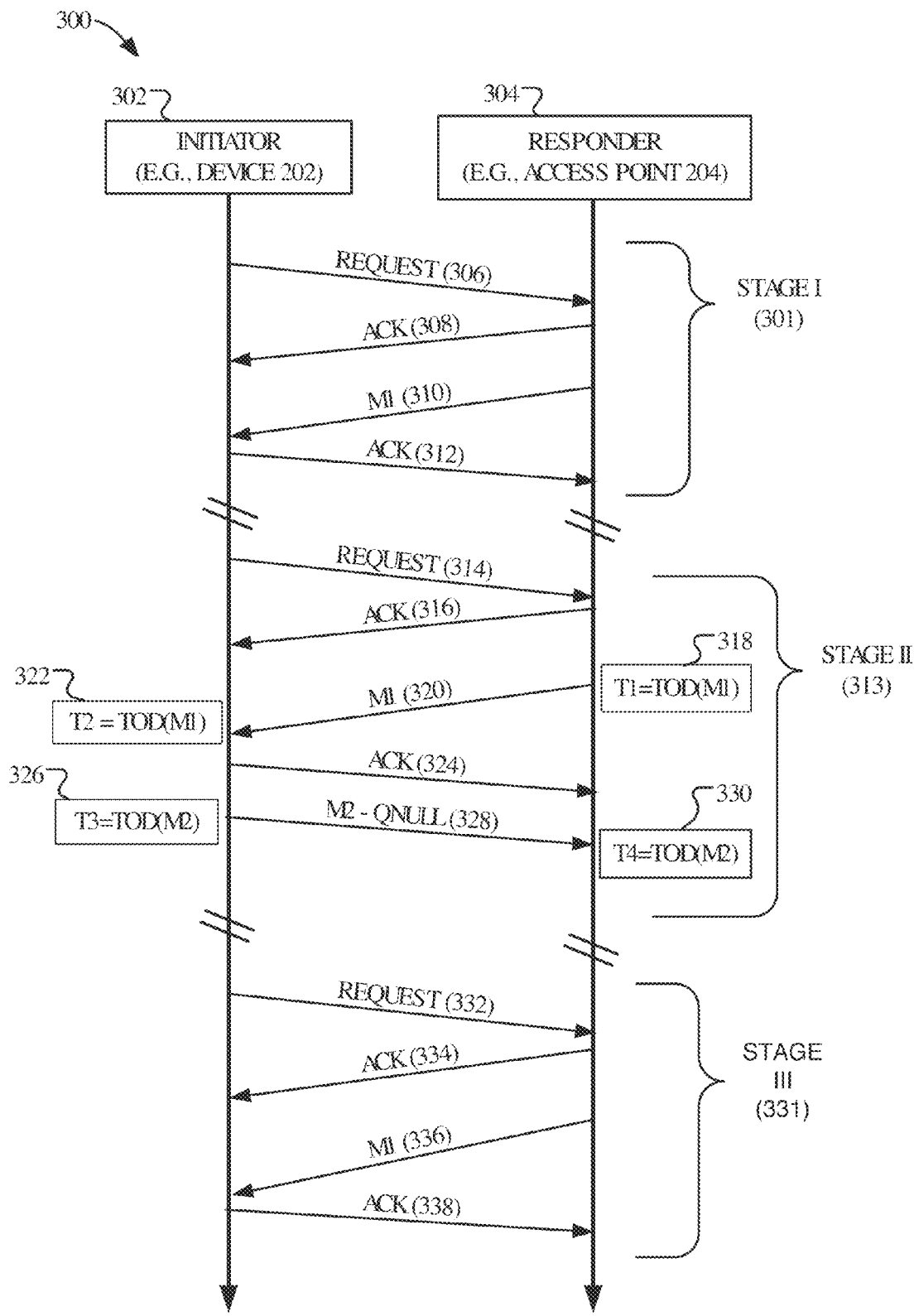
FIG. 3 is a swim-lane chart illustrating the operation of a method for determining a position of a device with an access point in accordance with some embodiments.

FIG. 3 is a swim-lane chart illustrating the operation of a method 300 for determining a position of a device with an access point in accordance with some embodiments. For example, the initiator 302 (e.g., device 202 of FIG. 2) and the responder 304 (e.g., first access point 204 of FIG. 2) may be configured to perform the method 300, or portions thereof. The method 300 may begin with an initial stage I negotiation at 301.

In an example, the initiator 302 may transmit a request 306 to establish communication with the responder 304. The responder 304 may respond with an acknowledgement (ACK) 308 indicating the capability of providing location determination services. The responder 304 may also transmit a M1 message 310 as part of a comeback time negotiation. The initiator 302 may transmit an ACK 312 to complete the comeback time negotiation and the stage I 301 negotiation.

Method 300 may continue with a stage II 313 sounding exchange. In an example, the initiator 302 may transmit a ranging request 308 to the responder 304. The responder 304 may respond with an acknowledgement (ACK) 316 indicating availability to perform the ranging exchange. At 318, time T1, the responder 304 may send a first message M1 320 that may include departure timing information, e.g., TOD (M1), to the initiator 302. At 322, an arrival time T2, the initiator 302 receives the first message 320, and in response, transmits an ACK 324 to the responder 304. The ACK 324 may include data that indicates the arrival time T2 of the first message 320. At a departure time T3 326, the initiator 302 sends second message M2 328 to the responder 304 that may include the departure time of the second message 328. At 330, arrival time T4, the responder 304 receives the second message 328 from the initiator 302, and may calculate a range between the initiator 302 and the responder 304.

Method 300 may continue with a stage III 331 with a reporting or timestamp polling phase. For example, the initiator 302 may transmit a request 332 to the responder 304 requesting the range between the initiator 302 and the responder 304 as calculated by the responder 304, or the request 332 may include an indication that an additional ranging exchange is requested. The responder 304 may respond with an acknowledgement (ACK) 334 indicating the range or capability to perform an additional ranging exchange. The responder 304 may also transmit a M1 message 336 as part of a next comeback time negotiation. The initiator 302 may transmit an ACK 338 to complete the comeback time negotiation and the stage III 331.

Figure 4:
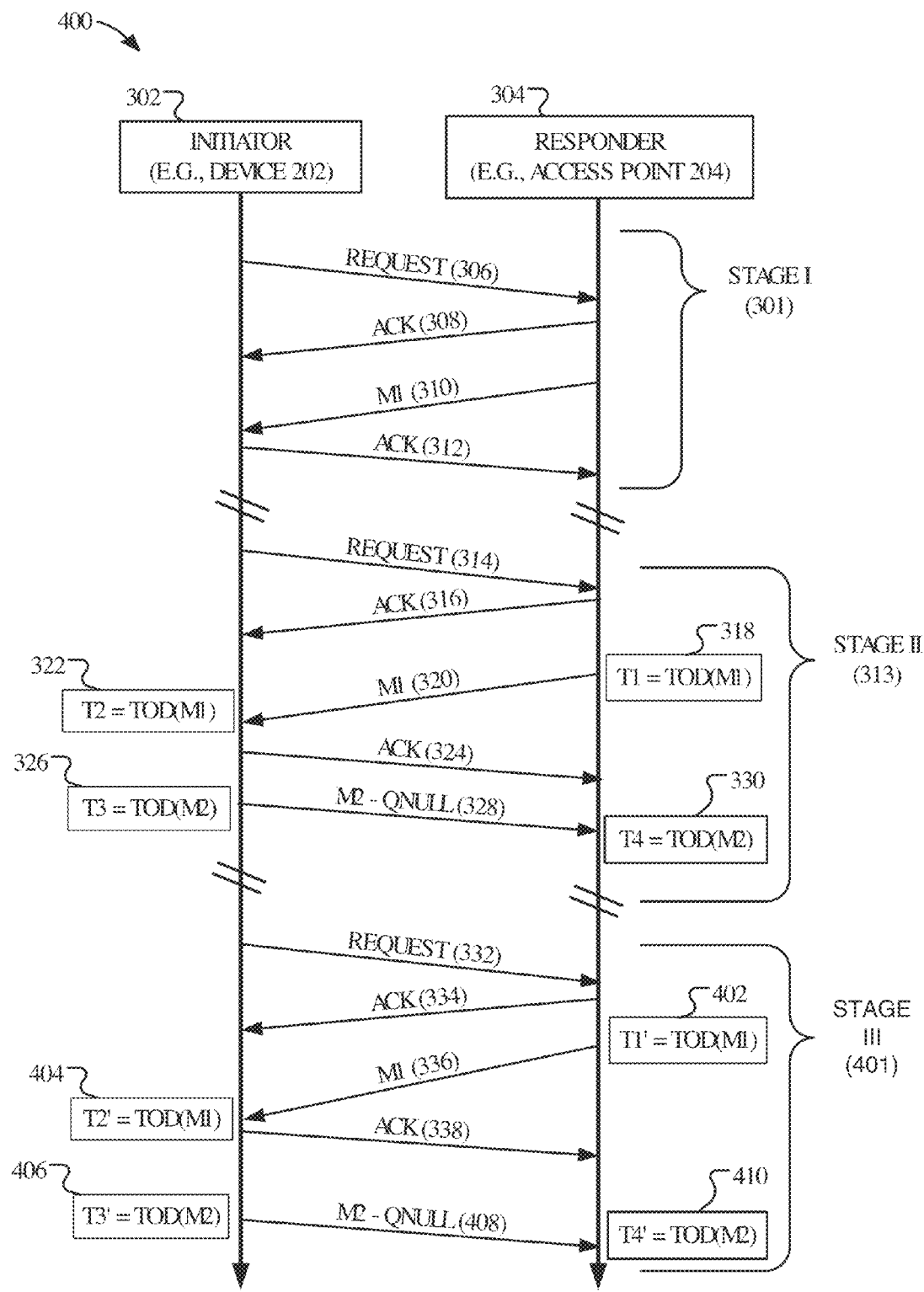
FIG. 4 is a swim-lane chart illustrating the operation of a method for monitoring interaction of a device with an access point in accordance with some embodiments.

FIG. 4 is a swim-lane chart illustrating the operation of a method 400 for determining a position of a device with an access point in accordance with some embodiments. Method 400 may begin with the elements described in stage I 301 and stage II 313 of method 300 of FIG. 3.

Method 400 may continue with a stage III 401 with a reporting or timestamp polling phase that includes an additional sounding exchange. For example, the initiator 302 may transmit the request 332 to the responder 304 requesting the range between the initiator 302 and the responder 304 as calculated by the responder 304. The request 332 includes an indication that an additional ranging exchange is requested. The responder 304 may respond with an acknowledgement (ACK) 334 indicating the range and capability to perform an additional ranging exchange. At time T1' 402, the responder 304 may transmit a M1 message 336 as part of a next sounding exchange. At time T2' 404 the initiation 302 may receive the message 336 that includes the time of departure of the message 336. The initiator 302 may transmit an ACK 338 to the responder 304. At time T3' 406, the initiator 302 may transmit a second message M2 408 to the responder 304. At time T4' the responder may receive the second message M2 408, and complete the stage III 401 by calculate a range between the initiator 302 and the responder 304 based on times T1', T2', T3' and T4'.

Three types of frames may be utilized to perform a fine timing measurement protocol exchange, such as those described with respect to method 300 of FIG. 3 and method 400 of FIG. 4. The first frame is a fine timing measurement request (FTMR). The FTMR may be transmitted by an initiator, such as device 202 of FIG. 2. The FTMR may be utilized to initiate a negotiation of the follow up fine timing measurement exchange details, to report previous fine timing measurement timestamps (T3-T2), and to poll previous fine timing measurement timestamps (T4-T1). The second frame is fine timing measurement 1 (FTM1). FTM1 may be transmitted by responder in response to receiving FTMR. The FTM1 may be utilized to report previous fine timing measurement timestamps (T4-T1), to report next follow up fine timing measurement details, and to act as a fine timing measurement frame in case of fine timing measurement exchange. The third frame is fine timing measurement 2 (FTM2). FTM2 may be transmitted by the initiator in case of fine timing measurement exchange, and acts as a fine timing measurement frame.

A fine timing measurement request (FTMR) may be based on the FTMR frame structure as discussed in IEEE draft P802.11 REVmc_D.1.2—Section 8.6.8.25. In addition to vendor specific IE to complete the added field for the E2E protocol FTMR is a public action frame that utilizes an acknowledgment (Ack).

An example FTMR Frame structure:

|  | Category | Action | Trigger | Vendor specific IE |
|---|---|---|---|---|
| Octets: | 1 | 1 | 1 | 16 |

An example of the FTMR Vendor specific field

| | Element ID | Length | OUI | Sub-type | Dialog Token | Polled Dialog Token | Previous T3-T2 | Previous T3-T2 Error |
|---|---|---|---|---|---|---|---|---|
| Octets: | 1 | 1 | 3 | 1 | 1 | 1 | 6 | 2 |

An example FTMR Frame subfields:

| Subfield | Definition | Encoding |
|---|---|---|
| Category | The category field is set to the value for Public action frame | 4 |
| Action | The Public Action field is set to indicate a Fine Timing Measurement Request frame | <ANA> |
| Trigger | Reserved field from original FTM as defined in REVmc | 0 |
| Vendor specific IE | FTMR Vendor specific | Specified in FTMR vendor specific subfield table. |

An example FTMR vendor specific Frame subfields:

| Subfield | Definition | Encoding |
|---|---|---|
| Element ID | Vendor specific element ID | 0xDD |
| Length | Specifies the length in Bytes for FTMR Vendor specific IE | 14 |
| OUI | Vendor specific OUI | Any relevant vendor specific OUI. |
| Dialog Token | Token ID of the fine timing measurement exchange to be followed | Non zero unique value marks the following fine timing measurement exchange ID. A value of zero marks that no further fine timing measurement exchange are requested or needed. |
| Polled dialog token | Token ID of the previous fine timing measurement exchange | Non zero unique value marks the previous fine timing measurement exchange. A value of zero marks that there was not any relevant previous exchange associated with this recipient. |
| Previous T3-T2 | T3-T2 value of from previous fine timing exchange results | Defined in units equal to 0.1 nS. A value of 0xFFFFFF indicates invalid measurement. |
| Previous T3-T2 Error | Max T3-T2 error value of previous fine timing exchange results | Error value is equal to (2 * RMS) defined in units equal to 0.1 nS. A value of zero indicates an unknown error. A value of 0xFFFF indicates an error of 6553.5 nS or larger. |

Fine timing measurement 1 (FTM1) may be based on IEEE draft standard, such as IEEE P802.11REVmc_D.1.2—Section 8.6.8.26, in addition to vendor specific IE to complete the added field for the E2E protocol.

FTM1 may include a public action frame that utilizes an acknowledgement (ACK). The FTM1 may be sent at one of the following three rates: bandwidth (BW) of 20 Mhz, 40 Mhz, or 80 Mhz but not to exceed the recipient's supported channel width; MCS/Rate: HT0 or non-HT Rate 6 Mbps duplicate; or spatial streams of either SISO/MIMO that do not exceed recipient's supported MCS se FTM1 may set the duration field taking into account: FTM1+Sifs+Ack+Sifs+M2.

An example FTM1 Frame structure:

| Category | Action | Dialog Token | Polled Dialog Token | TOD | TOA | Max TOD Error | Max TOA Error | Vendor specific IE |
|---|---|---|---|---|---|---|---|---|
| Octets: 1 | 1 | 1 | 1 | 6 | 6 | 2 | 2 | 29 |

An example FTM1 Vendor specific structure:

| Element ID | Length | OUI | Subtype | Dialog Token | Polled Dialog Token |
|---|---|---|---|---|---|
| Octets: 1 | 1 | 3 | 1 | 15 | 8 |

An example dialog token info (as part of FTM1 Vendor specific) structure:

| Resource Availability | Comeback Delay | Comeback Interval | Comeback Window | Comeback Timeout Count |
|---|---|---|---|---|
| 4 | 4 | 4 | 2 | 1 |

An example polled dialog token info (as part of FTM1 Vendor specific) structure:

| Prev T4-T1 | Prev T4-T1 Error |
|---|---|
| 6 | 2 |

An example FTM1 subfield structure:

| Subfield | Definition | Encoding |
|---|---|---|
| Category | The category field is set to the value for Public action frame | 4 |
| Action | The Public Action field is set to indicate a Fine Timing Measurement Request frame | <ANA> |
| Dialog Token | Token ID of the fine timing measurement exchange to be followed | Non zero unique value indicates the following fine timing measurement exchange ID and fits the same dialog token as in ranging request/poll frame. |
| Polled Dialog Token | Token ID of the previous fine timing measurement exchange | Non zero unique value indicates the previous fine timing measurement exchange ID. A value of zero indicates that there were not any relevant previous exchanges associated with this recipient. |
| ToD | Reserved field | 0 |
| ToA | Reserved field | 0 |
| Max ToD Error | Reserved field | 0 |
| Max ToA Error | Reserved field | 0 |
| Vendor specific IE | FTMR Vendor specific | (discussed below) |

An example of FTM1 vendor specific subfields:

| Subfield | Definition | Encoding |
|---|---|---|
| Element ID | Specified action ID for M1 | |
| Length | Specifies the length in Bytes for M1 frame | 29 |
| OUI | Vendor specific OUI | Any relevant vendor specific OUI. |
| Subtype | Vendor specific subtype ID to represent FTMR extension IE | Any relevant vendor specific subtype that fits the Vendor specific IE. |
| Dialog Token Info | Will hold all relevant Information of the fine timing measurement exchange to be followed | (discussed below) |
| Polled Dialog Token Info | Will hold all relevant Information of the previous fine timing measurement exchange | (discussed below) |

An example of dialog token info (as part of FTM1 vendor specific) subfields:

| Subfield | Definition | Encoding |
|---|---|---|
| Resource availability | Indicates whether recipient is ready for fine timing measurement exchange | 0 - Resource not available for fine timing measurement exchange. 1 - Resource available for fine timing measurement exchange. |
| Comeback delay | Indicates the required delay till next fine timing measurement exchange availability | Non zero value in mS units indicating the recipient's next fine timing measurement exchange availability. A zero value will be used in case the recipient is always ready. |
| Comeback Interval | Indicates the re-current interval for the next fine timing, measurement exchange availability to be followed | Non zero value in mS units indicating the interval between next fine timing measurement exchange availability. A zero value will be used in case the recipient is always ready. |
| Comeback Window | Indicates the opportunity window of next fine timing measurement exchanges | A non-zero value in mS units indicating the opportunity window for next fine timing measurement exchanges. A zero value will be used in case the recipient is always ready. |
| Comeback timeout count | Indicates the expiration time of the recurrent comeback intervals/window | A value indicating number of instances for which the comeback interval/window is still valid (e.g., comeback window of 512 mS and timeout of four indicates a validity of two seconds). |

An example of polled dialog token info (as part of FTM1 vendor specific) subfields:

| Subfield | Definition | Encoding |
|---|---|---|
| Previous T4-T1 | T4-T1 value of previous fine timing exchange results | Defined in units equal to 0.1 nS. A value of 0xFFFFFF indicates invalid measurement. |
| Previous T4-T1 Error | Max T4-T1 error value of previous fine timing exchange results | Error value is equal to (2 * RMS) defined in units equal to 0.1 nS. Value of zero indicates an unknown error. Value of 0xFFFF indicates an error of 6553.5 nS or larger. |

Fine timing measurement 2 (FTM2) may be based on an IEEE draft specification such as, IEEE P802.11 REVmc_D.1.2—Section 8.6.8.26.

FTM2 may include a public action frame with No-Ack policy. FTM2 may be sent at the same BW, MCS/Rate, and Spatial stream as FTM1.

An example FTM2 Frame structure:

| Cat-egory | Ac-tion | Dialog Token | Polled Dialog Token | TOD | TOA | Max TOD Error | Max TOA Error |
|---|---|---|---|---|---|---|---|
| Octets: 1 | 1 | 1 | 1 | 6 | 6 | 2 | 2 |

An example of FTM2 subfields:

| Subfield | Definition | Encoding |
|---|---|---|
| Category | The category field is set to the value for Public action frame | 4 |
| Action | The Public Action field is set to indicate a Fine Timing Measurement Request frame | <ANA> |
| Dialog Token | Token ID of the fine timing measurement exchange to be followed | Non zero unique value indicates the following fine timing measurement exchange ID and fits the same dialog token as in ranging request/poll frame. |
| Polled Dialog Token | Token ID of the previous fine timing measurement exchange | n/a |
| ToD | Reserved field | n/a |
| ToA | Reserved field | n/a |
| Max ToD Error | Reserved field | n/a |
| Max ToA Error | Reserved field | n/a |

The following table describes an example retry policy and the expected error handling in case of missed or malformed packet arrival:

| Frame | Sent By | Retry Policy | Initiator error handling | Responder error handling |
|---|---|---|---|---|
| FTMR | Initiator | Standard | In case no Ack received, Initiator will retry the frame till exhaustion | n/a |
| FTM1 | Responder | No retries | In case FTM1 didn't arrive, Initiator will repeat FTMR if current window is still valid, or at next opportunity window (Note that backoff is used for both cases.) | In case FTM1 was not ACKed, and FTM2 didn't arrive, do nothing. In case FTM1 was not Ack, but FTM2 arrived, respect FTM2. |
| FTM2 | Initiator | No retries | | In case FTM2 didn't arrive, do nothing. |

Figure 5:
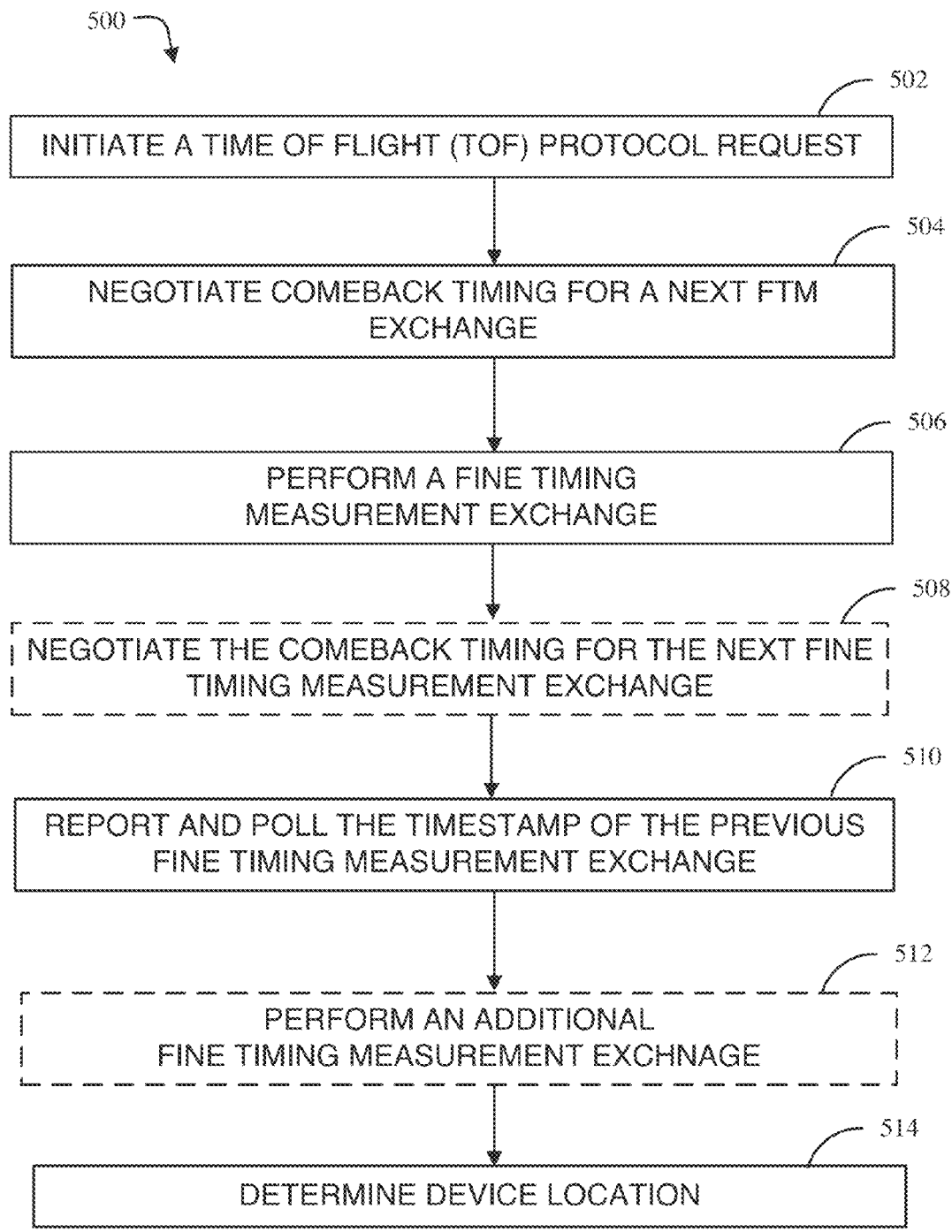
FIG. 5 is a flow diagram illustrating an example method for determining a position of a device in accordance with some embodiments.

FIG. 5 is a flowchart illustrating an example method 500 for determining a position of a device in accordance with some embodiments. In an example, the method 500 may be performed by an initiator, such as the device 202 of FIG. 2, in an attempt to perform a ranging exchange with a responder, such as the access point 204 of FIG. 2. The ranging exchange may include a time of flight (TOF) protocol that performs a fine-timing measurement (FTM).

If the initiator is not already connected to a wireless network, the method 500 may begin with a initiator attempt to discover available wireless networks. The wireless networks may utilize a Wi-Fi or IEEE 802.11 standard protocol, or a protocol such as the current 3GPP, LTE, or TDD-Advanced. At 502, the device may initiate the TOF protocol request with a responder.

At 504, the initiator may negotiate comeback timing for a next FTM exchange with the responder.

At 506 the initiator may perform a fine timing measurement exchange with the responder. In an example, the TOF packets received by the initiator from the responder may include data that indicate a time of arrival of the request at the responder, and a time of reply corresponding to the transmission of a response to the request by the responder.

At 508, the initiator may optionally negotiate the comeback timing for a next fine timing measurement exchange.

At 510, the initiator may receive one or more packets from the responder. The one or more packets may include timing data that indicate the request time and the response time as determined by the responder. In an example, the initiator or responder may perform a differential computation based on the exchange between the initiator and the responder to determine a distance between the initiator and the responder.

At 512, the initiator may optionally perform an additional fine timing measurement exchange with the responder.

At 514, the initiator or the responder may determine a location of the initiator. In an example, the location may be an absolute geographic location. In an example, the responder may provide its geographic locations, such as a data structure including a geographic latitude and longitude. In an example, the location may be a relative location with respect to the responder.

These operations of method 500 may also be performed by the device 202, access points 204, 208, 210, or a combination of processors in communication with device 202 of FIG. 2.

Optionally, method 500 may include one or more operations defined by any of a variety of network protocols and standards in licensed or unlicensed spectrum bands, including Wi-Fi P2P communications performed in connection with an IEEE 802.11 standard (for example, Wi-Fi Direct communications facilitated by software access points (Soft APs)), 3GPP LTE/LTE-A communications (for example, LTE Direct (LTE-D) communications established in a portion of an uplink segment or other designated resources), machine-to-machine (M2M) communications performed in connection with an IEEE 802.16 standard, and the like.

Though arranged serially in the example of FIG. 5, other examples may reorder the operations, omit one or more operations, and/or execute two or more operations in parallel using multiple processors or a single processor organized as two or more virtual machines or sub-processors. Moreover, still other examples may implement the operations as one or more specific interconnected hardware or integrated circuit modules with related control and data signals communicated between and through the modules. Thus, any process flow is applicable to software, firmware, hardware, and hybrid implementations.

Figure 6:
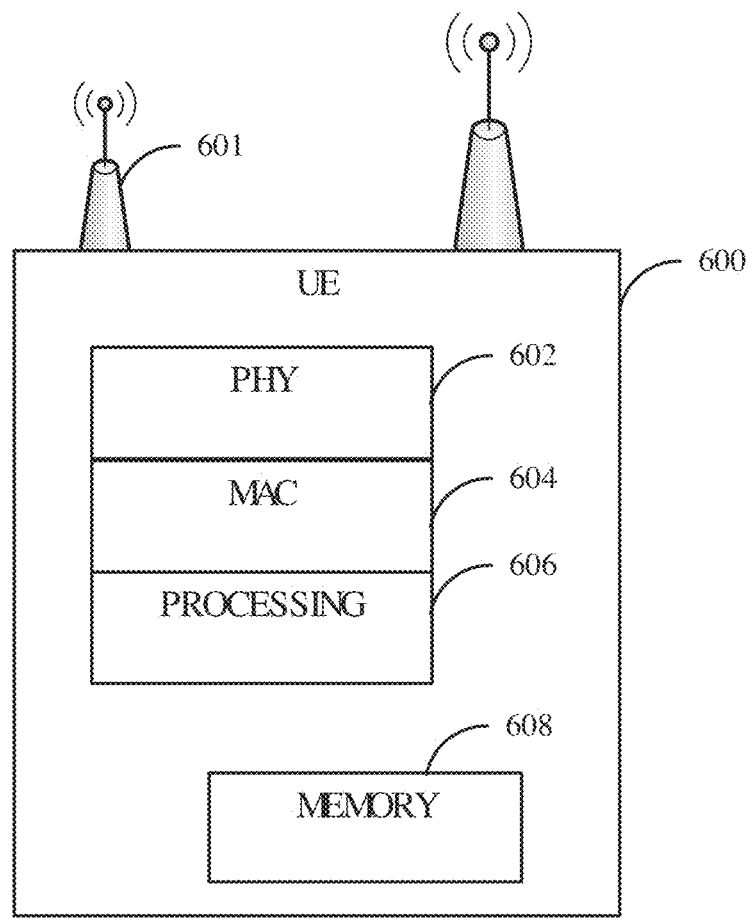
FIG. 6 illustrates a functional block diagram of user equipment (UE) in accordance with some embodiments.

FIG. 6 illustrates a functional block diagram of a UE 600 in accordance with some embodiments. The UE 600 may be suitable for use as device 112 (FIG. 1) or device 202 (FIG. 2). The UE 600 may include physical layer circuitry 602 for transmitting and receiving signals to and from eNBs using one or more antennas 601. UE 600 may also include processing circuitry 606 that may include, among other things a channel estimator. UE 600 may also include a memory 608. The processing circuitry may be configured to determine several different feedback values discussed below for transmission to the eNB. The processing circuitry may also include a media access control (MAC) layer 604.

In some embodiments, the UE 600 may include one or more of a keyboard, a display, a non-volatile memory port, multiple antennas, a graphics processor, an application processor, speakers, and other mobile device elements. The display may be an LCD screen including a touch screen.

The one or more antennas 601 utilized by the UE 600 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to 1/10 of a wavelength or more.

Although the UE 600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors of the UTE 600 may be configured with the instructions to perform the operations described herein.

In some embodiments, the UE 600 may be configured to receive orthogonal frequency-division multiplexing (OFDM) communication signals over a multicarrier communication channel in accordance with an OFDMA communication technique. The OFDM signals may comprise a plurality of orthogonal subcarriers. In some broadband multicarrier embodiments, eNBs (including macro eNB and pico eNBs) may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the inventive subject matter described herein is not limited in this respect. In these broadband multicarrier embodiments, the UE 600 and the eNBs may be configured to communicate in accordance with an orthogonal frequency division multiple access (OFDMA) technique. The UTRAN LTE standards include the 3rd Generation Partnership Project (3GPP) standards for UTRAN-LTE, release 8, March 2008, and release 10, December 2010, including variations and evolutions thereof.

In some LTE embodiments, the basic unit of the wireless resource is the Physical Resource Block (PRB). The PRB may comprise 12 sub-carriers in the frequency domain×0.5 ms in the time domain. The PRBs may be allocated in pairs (in the time domain). In these embodiments, the PRB may comprise a plurality of resource elements (REs). A RE may comprise one sub-carrier×one symbol.

Two types of reference signals may be transmitted by an eNB including demodulation reference signals (DM-RS), channel state information reference signals (CIS-RS) and/or a common reference signal (CRS). The DM-RS may be used by the UE for data demodulation. The reference signals may be transmitted in predetermined PRBs.

In some embodiments, the OFDMA technique may be either a frequency domain duplexing (FDD) technique that uses different uplink and downlink spectrum or a time-domain duplexing (TDD) technique that uses the same spectrum for uplink and downlink.

In some other embodiments, the UE 600 and the eNBs may be configured to communicate signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the UE 600 may be part of a portable wireless communication device, such as a PDA, a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some LTE embodiments, the UE 600 may calculate several different feedback values which may be used to perform channel adaption for closed-loop spatial multiplexing transmission mode. These feedback values may include a channel-quality indicator (CQI), a rank indicator (RI) and a precoding matrix indicator (PMI). By the CQI, the transmitter selects one of several modulation alphabets and code rate combinations. The RI informs the transmitter about the number of useful transmission layers for the current MIMO channel, and the PMI indicates the codebook index of the precoding matrix (depending on the number of transmit antennas) that is applied at the transmitter. The code rate used by the eNB may be based on the CQI. The PMI may be a vector that is calculated by the UE and reported to the eNB. In some embodiments, the UE may transmit a physical uplink control channel (PUCCH) of format 2, 2a or 2b containing the CQI/PMI or RI.

In these embodiments, the CQI may be an indication of the downlink mobile radio channel quality as experienced by the UE 600. The CQI allows the UE 600 to propose to an eNB an optimum modulation scheme and coding rate to use for a given radio link quality so that the resulting transport block error rate would not exceed a certain value, such as 10%. In some embodiments, the UE may report a wideband CQI value which refers to the channel quality of the system bandwidth. The UE may also report a sub-band CQI value per sub-band of a certain number of resource blocks which may be configured by higher layers. The full set of sub-bands may cover the system bandwidth. In case of spatial multiplexing, a CQI per code word may be reported.

In some embodiments, the PMI may indicate an optimum precoding matrix to be used by the eNB for a given radio condition. The PMI value refers to the codebook table. The network configures the number of resource blocks that are represented by a PMI report. In some embodiments, to cover the system bandwidth, multiple PMI reports may be provided. PMI reports may also be provided for closed loop spatial multiplexing, multi-user MIMO and closed-loop rank 1 precoding MIMO modes.

In some cooperating multipoint (CoMP) embodiments, the network may be configured for joint transmissions to a UE in which two or more cooperating/coordinating points, such as remote-radio heads (RRHs) transmit jointly. In these embodiments, the joint transmissions may be MIMO transmissions and the cooperating points are configured to perform joint beamforming.

Figure 7:
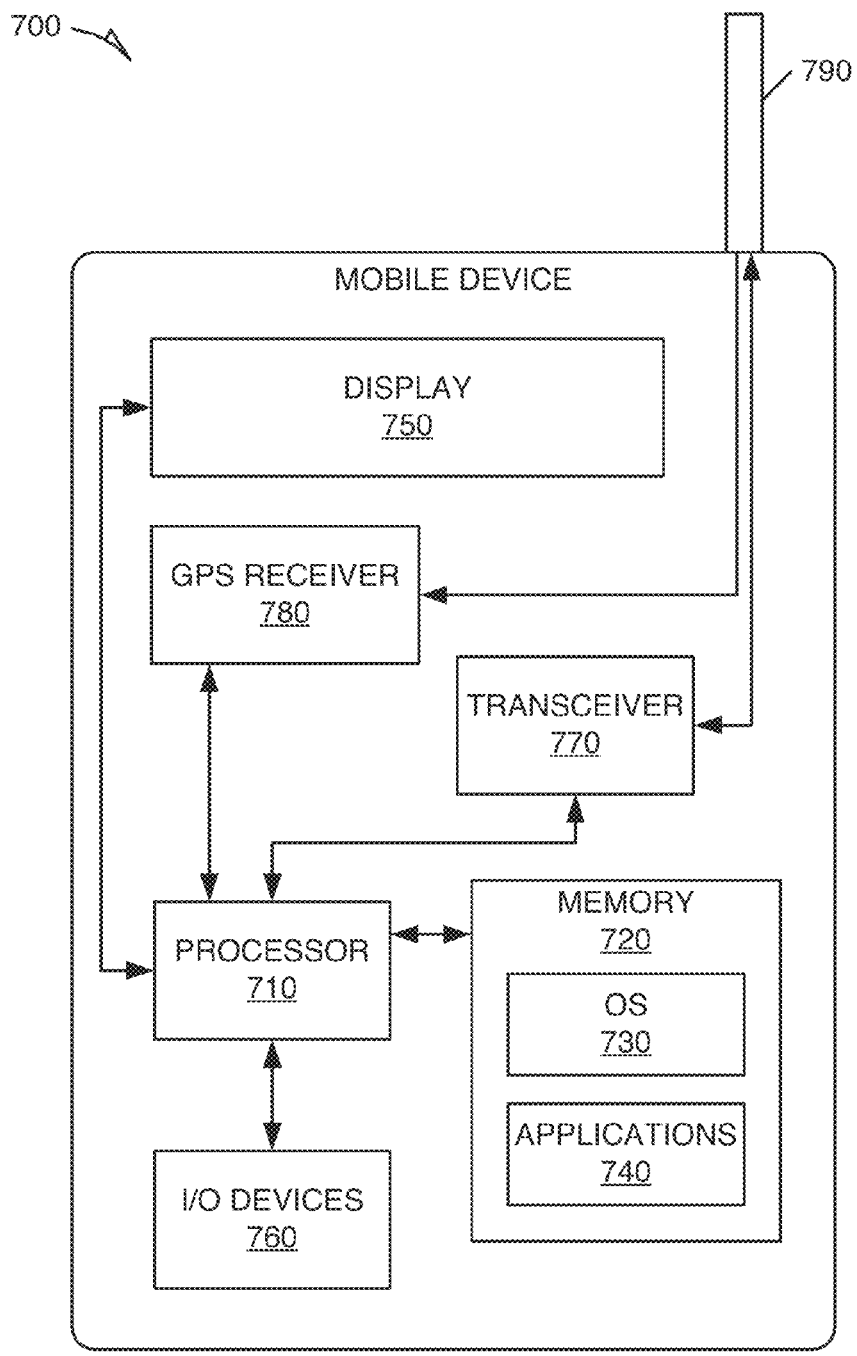
FIG. 7 is a block diagram illustrating a mobile device in accordance with some embodiments.

FIG. 7 is a block diagram illustrating a mobile device 700, upon which any one or more of the techniques (e.g., methodologies) discussed herein may be performed. The mobile device 700 may include a processor 710. The processor 710 may be any of a variety of different types of commercially available processors suitable for mobile devices, for example, an XScale architecture microprocessor, a Microprocessor without Interlocked Pipeline Stages (MIPS) architecture processor, or another type of processor. A memory 720, such as a Random Access Memory (RAM), a Flash memory, or other type of memory, is typically accessible to the processor 710. The memory 720 may be adapted to store an operating system (OS) 730, as well as application programs 740. The OS 730 or application programs 740 may include instructions stored on a computer readable medium (e.g., memory 720) that may cause the processor 710 of the mobile device 700 to perform any one or more of the techniques discussed herein. The processor 710 may be coupled, either directly or via appropriate intermediary hardware, to a display 750 and to one or more input/output (I/O) devices 760, such as a keypad, a touch panel sensor, a microphone, etc. Similarly, in an example embodiment, the processor 710 may be coupled to a transceiver 770 that interfaces with an antenna 790. The transceiver 770 may be configured to both transmit and receive cellular network signals, wireless data signals, or other types of signals via the antenna 790, depending on the nature of the mobile device 700. Further, in some configurations, a GPS receiver 780 may also make use of the antenna 790 to receive GPS signals.

Figure 8:
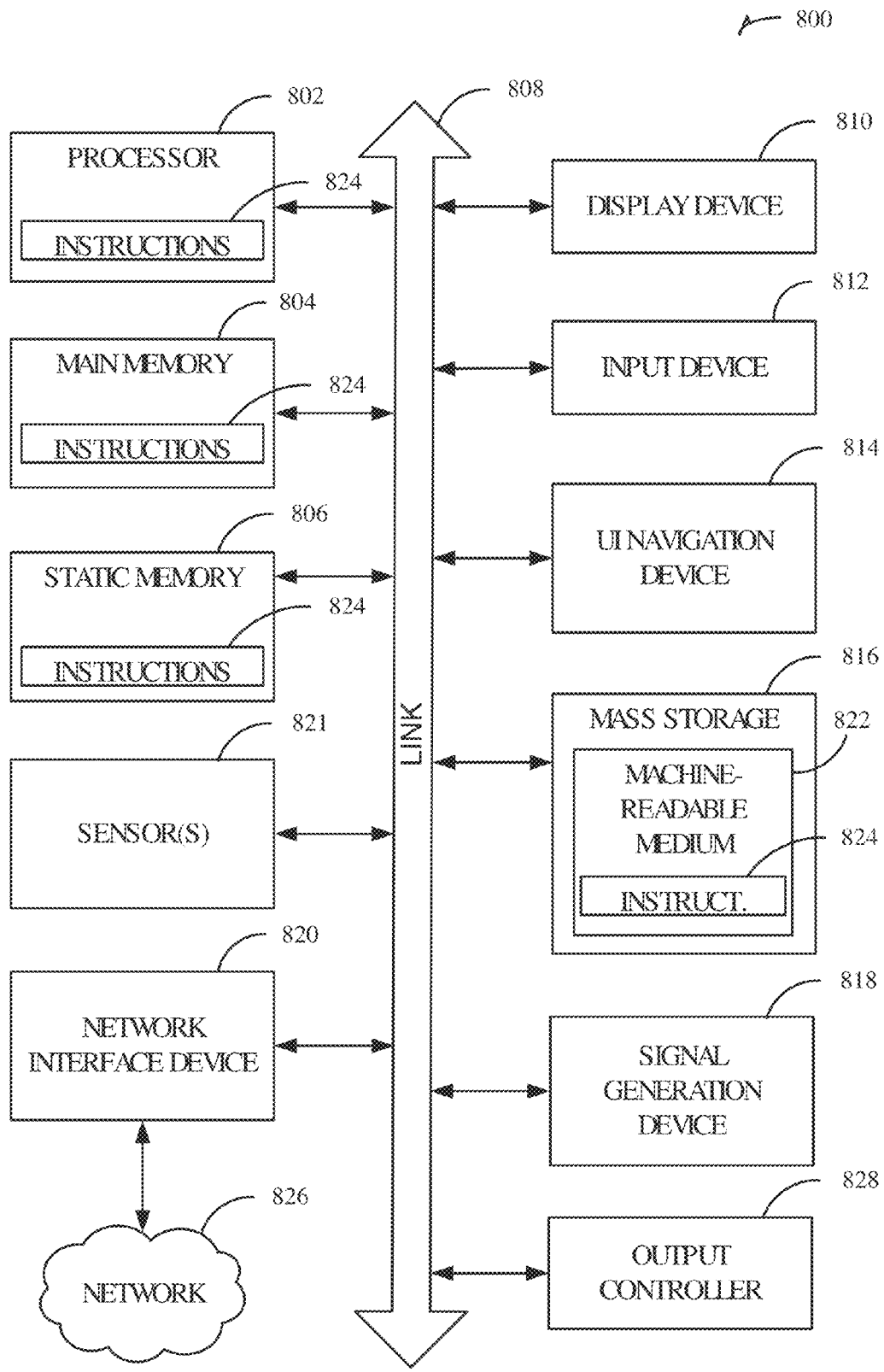
FIG. 8 is a diagrammatic representation of a machine in the example form of a computer system within which a set of instructions for causing the machine to perform any one or more of the methodologies discussed herein may be executed.

FIG. 8 illustrates a block diagram of an example machine 800 upon which any one or more of the techniques (e.g., methodologies) discussed herein may be performed. In alternative embodiments, the machine 800) may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a Personal Digital Assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system or device) 800 may include a hardware processor 802 (e.g., a processing unit, a graphics processing unit (GPU), a hardware processor core, or any combination thereof), a main memory 804, and a static memory 806, some or all of which may communicate with each other via a link 808 (e.g., a bus, link, interconnect, or the like). The machine 800) may further include a display device 810, an input device 812 (e.g., a keyboard), and a user interface (UI) navigation device 814 (e.g., a mouse). In an example, the display device 810, input device 812, and UI navigation device 814 may be a touch screen display. The machine 800 may additionally include a mass storage (e.g., drive unit) 816, a signal generation device 818 (e.g., a speaker), a network interface device 820, and one or more sensors 821, such as a global positioning system (GPS) sensor, camera, video recorder, compass, accelerometer, or other sensor. The machine 800 may include an output controller 828, such as a serial (e.g., universal serial bus (USB), parallel, or other wired or wireless (e.g., infrared (IR)) connection to communicate or control one or more peripheral devices (e.g., a printer, card reader, etc.).

The mass storage 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the mass storage 816 may constitute machine-readable media.

While the machine-readable medium 822 is illustrated as a single medium, the term "machine readable medium" may include a single medium or multiple media (e.g., a centralized or distributed database, and/or associated caches and servers) that configured to store the one or more instructions 824.

The term "machine-readable medium" may include any tangible medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). The term "transmission medium" shall be taken to include any intangible medium that is capable of storing, encoding or carrying instructions for execution by the machine 800, and includes digital or analog communications signals or other intangible medium to facilitate communication of such software.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The example embodiments discussed herein may be utilized by wireless network access providers of all types including, but not limited to, mobile broadband providers looking to increase cellular offload ratios for cost-avoidance and performance gains, fixed broadband providers looking to extend their coverage footprint outside of customers' homes or businesses, wireless network access providers looking to monetize access networks via access consumers or venue owners, public venues looking to provide wireless network (e.g., Internet) access, or digital services (e.g. location services, advertisements, entertainment, etc.) over a wireless network, and business, educational or non-profit enterprises that desire to simplify guest Internet access or Bring-Your-Own-Device (BYOD) access.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus including a memory and a processor comprising circuitry to cause a communication station (STA) to:

perform a time negotiation for a fine timing measurement (FTM) exchange stage with a responding station, the time negotiation including transmission of a first message from the STA to the responding station, reception at the STA of a first Acknowledgement (ACK) message from the responding station to acknowledge the first message, reception at the STA of a second message from the responding station after the first ACK message, the second message including a plurality of timing parameters, and transmission of a second ACK message to the responding STA to acknowledge the second message, the plurality of timing parameters comprising a parameter configured to indicate a time interval to perform the FTM exchange stage; and exchange a plurality of measurements for the FTM exchange stage with the responding station according to the plurality of timing parameters.

2. The apparatus of claim 1, wherein the circuitry is to cause the STA to perform the FTM exchange stage by exchanging with the responding station a plurality of FTM messages, an FTM message of the plurality of FTM messages including one or more timestamps.

3. The apparatus of claim 2, wherein the FTM message further comprises:

a plurality of fields configured to provide parameters related to a FTM procedure.

4. The apparatus of claim 1, wherein the circuitry is to cause the STA to renegotiate additional timing parameters with the responding station.

5. The apparatus of claim 4, wherein the circuitry is configured to cause the STA to:

perform an additional FTM exchange stage with the responding station based on the additional timing parameters.

6. The apparatus of claim 1, wherein the circuitry is configured to cause the STA to:

determine a location of the STA based on the FTM exchange stage.

7. The apparatus of claim 1, wherein the FTM exchange stage is in accordance with an IEEE 802.11 standard family.

8. The apparatus of claim 1 comprising a transmitter configured to transmit the first message and the second ACK message from the STA to the responding station, and a receiver to receive at the STA the first ACK message and the second message from the responding station.

9. The apparatus of claim 1 comprising one or more antennas.

10. An apparatus including a memory and a processor comprising circuitry to cause a communication station (STA) to:

perform a time negotiation for a fine timing measurement (FTM) exchange stage with an initiating station, the time negotiation including reception of a first message from the initiating station, transmission of a first Acknowledgement (ACK) message from the STA to the initiating station to acknowledge the first message, transmission of a second message from the STA to the initiating station after the first ACK message, the second message including a plurality of timing parameters, and reception of a second ACK message from the initiating station to acknowledge the second message, the plurality of timing parameters comprising a parameter configured to indicate a time interval to perform the FTM exchange stage; and exchange a plurality of measurements for the FTM exchange stage with the initiating station according to the plurality of timing parameters.

11. The Apparatus of claim 10, wherein the circuitry is to cause the STA to renegotiate additional timing parameters with the initiating station, and to perform an additional FTM exchange stage with the initiating station based on the additional timing parameters.

12. The apparatus of claim 10, wherein the circuitry is to cause the STA to perform the FTM exchange stage by exchanging a plurality of FTM messages with the initiating station, an FTM message of the plurality of FTM messages including one or more timestamps.

13. The apparatus of claim 12, wherein the FTM message further comprises:
a plurality of fields configured to provide parameters related to a FTM procedure.

14. The apparatus of claim 10, wherein the circuitry is configured to cause the STA to:
determine a location of the initiating station based on the plurality of measurements of the FTM exchange stage.

15. The apparatus of claim 10 comprising a receiver configured to receive the first message and the second ACK message from the initiating station, and a transmitter to transmit the first ACK message and the second message from the STA to the initiating station.

16. The apparatus of claim 10 comprising one or more antennas.

17. A non-transitory machine readable medium including instructions that, when executed by a communication station (STA), cause the STA to:
perform a time negotiation for a fine timing measurement (FTM) exchange stage with a responding station, the time negotiation including transmission of a first message from the STA to the responding station, reception at the STA of a first Acknowledgement (ACK) message from the responding station to acknowledge the first message, reception at the STA of a second message from the responding station after the first ACK message, the second message including a plurality of timing parameters, and transmission of a second ACK message to the responding STA to acknowledge the second message, the plurality of timing parameters comprising a parameter configured to indicate a time interval to perform the FTM exchange stage; and
exchange a plurality of measurements for the FTM exchange stage with the responding station according to the plurality of timing parameters.

18. The non-transitory machine readable medium of claim 17, wherein the instructions, when executed, cause the STA to renegotiate additional timing parameters with the responding station, and to perform an additional FTM exchange stage with the responding station based on the additional timing parameters.

19. The non-transitory machine readable medium of claim 17, comprising instructions to cause the STA to perform the FTM exchange stage by exchanging with the responding station a plurality of FTM messages, an FTM message of the plurality of FTM messages including one or more timestamps and a plurality of fields configured to provide parameters related to a FTM procedure.

20. The non-transitory machine readable medium of claim 17, comprising instructions to cause the STA to determine a location of the STA based on the plurality of measurements of the FTM exchange stage.

21. A non-transitory machine readable medium including instructions that, when executed by a responding station, cause the responding station to:
perform a time negotiation for a fine timing measurement (FTM) exchange stage with an initiating station, the time negotiation including reception of a first message from the initiating station, transmission of a first Acknowledgement (ACK) message to the initiating station to acknowledge the first message, transmission of a second message to the initiating station after the first ACK message, the second message including a plurality of timing parameters, and reception of a second ACK message from the initiating station to acknowledge the second message, the plurality of timing parameters comprising a parameter configured to indicate a time interval to perform the FTM exchange stage; and
exchange a plurality of measurements for the FTM exchange stage with the initiating station according to the plurality of timing parameters.

22. The non-transitory machine readable medium of claim 21, wherein the instructions, when executed, cause the responding station to renegotiate additional timing parameters with the initiating station, and to perform an additional FTM exchange stage with the initiating station based on the additional timing parameters.

23. The non-transitory machine readable medium of claim 21, comprising instructions to cause the responding station to perform the FTM exchange stage by exchanging with the initiating station a plurality of FTM messages, an FTM message of the plurality of FTM messages including one or more timestamps and a plurality of fields configured to provide parameters related to a FTM procedure.

24. The non-transitory machine readable medium of claim 21, comprising instructions to cause the responding station to determine a location of the initiating station based on the plurality of measurements of the FTM exchange stage.

25. A method of fine timing measurements (FTM) to be performed by an initiating station, the method comprising:
performing a time negotiation for an FTM exchange stage with a responding station, the time negotiation including sending a first message from the initiating station to the responding station, receiving at the initiating station a first Acknowledgement (ACK) message from the responding station to acknowledge the first message, receiving at the initiating station a second message from the responding station after the first ACK message, the second message including a plurality of timing parameters, and sending a second ACK message to the responding STA to acknowledge the second message, the plurality of timing parameters comprising a parameter configured to indicate a time interval to perform the FTM exchange stage; and
exchanging a plurality of measurements for the FTM exchange stage with the responding station according to the plurality of timing parameters.

26. The method of claim 25 comprising renegotiating additional timing parameters with the responding station and performing an additional FTM exchange stage with the responding station based on the additional timing parameters.

27. The method of claim 25, wherein exchanging comprising:

exchanging with the responding station a plurality of FTM messages, an FTM message of the plurality of FTM messages including one or more timestamps and a plurality of fields configured to provide parameters related to a FTM procedure.

28. A method of fine timing measurements (FTM) to be performed by a responding station, the method comprising:

performing a time negotiation for an FTM exchange stage with an initiating station, the time negotiation including receiving a first message from the initiating station, transmitting to the initiating station a first Acknowledgement (ACK) message to acknowledge the first message, transmitting to the initiating station a second message after the first ACK message, the second message including a plurality of timing parameters, and receiving a second ACK message from the initiating station to acknowledge the second message, the plurality of timing parameters comprising a parameter configured to indicate a time interval to perform the FTM exchange stage; and exchanging plurality of measurements for the FTM exchange stage with the initiating station according to the plurality of timing parameters.

29. The method of claim 28 comprising renegotiating additional timing parameters with the initiating station, and performing an additional FTM exchange stage with the initiating station based on the additional timing parameters.

30. The method of claim 28, wherein exchanging comprising:

exchanging with the initiating station a plurality of FTM messages, an FTM message of the plurality of FTM messages including one or more timestamps and a plurality of fields configured to provide parameters related to a FTM procedure.

31. A wireless communication system comprising:

a communication station (STA) comprising processing circuitry, one or more antennas, and a transceiver coupled to the processing circuitry and the one or more antennas, wherein the processing circuitry is configured to cause the STA to:

perform a time negotiation of a fine timing measurement (FTM) exchange stage with an initiating station, the time negotiation including reception of a first message from the initiating station, transmission of a first Acknowledgement (ACK) message to the initiating station to acknowledge the first message, and transmission of a second message to the initiating station after the first ACK message, the second message including a plurality of timing parameters, and reception of a second ACK message from the initiating station to acknowledge the second message, the plurality of timing parameters comprising a parameter configured to indicate a time interval to perform the FTM exchange stage; and exchange a plurality of measurements for the FTM exchange stage with the initiating station according to the plurality of timing parameters.

32. The wireless communication system of claim 31, wherein the processing circuitry is to cause the STA to perform the FTM exchange stage by exchanging with the initiating station a plurality of FTM messages, an FTM message of the plurality of FTM messages including one or more timestamps and a plurality of fields configured to provide parameters related to a FTM procedure.

33. The wireless communication system of claim 31, wherein the processing circuitry is to cause the STA to renegotiate additional timing parameters with the initiating station, and to perform an additional FTM exchange stage with the initiating station based on the additional timing parameters.

34. The wireless communication system of claim 31, wherein the processing circuitry is to cause the STA to determine a location of the initiating station based on the plurality of measurements of the FTM exchange stage.

35. The wireless communication system of claim 31, wherein the FTM exchange stage is in accordance with an IEEE 802.11 standard family.

* * * * *

UNITED STATES PATENT AND TRADEMARK OFFICE
CERTIFICATE OF CORRECTION

PATENT NO.       : 10,034,188 B2
APPLICATION NO.  : 14/419921
DATED            : July 24, 2018
INVENTOR(S)      : Shani Ben-Haim et al.

Page 1 of 1

It is certified that error appears in the above-identified patent and that said Letters Patent is hereby corrected as shown below:

In the Claims

In Column 22, Line 7, in Claim 31, delete "and transmission" and insert -- transmission --, therefor.

Signed and Sealed this
Fourth Day of September, 2018

Andrei Iancu
*Director of the United States Patent and Trademark Office*